UNITED STATES PATENT OFFICE.

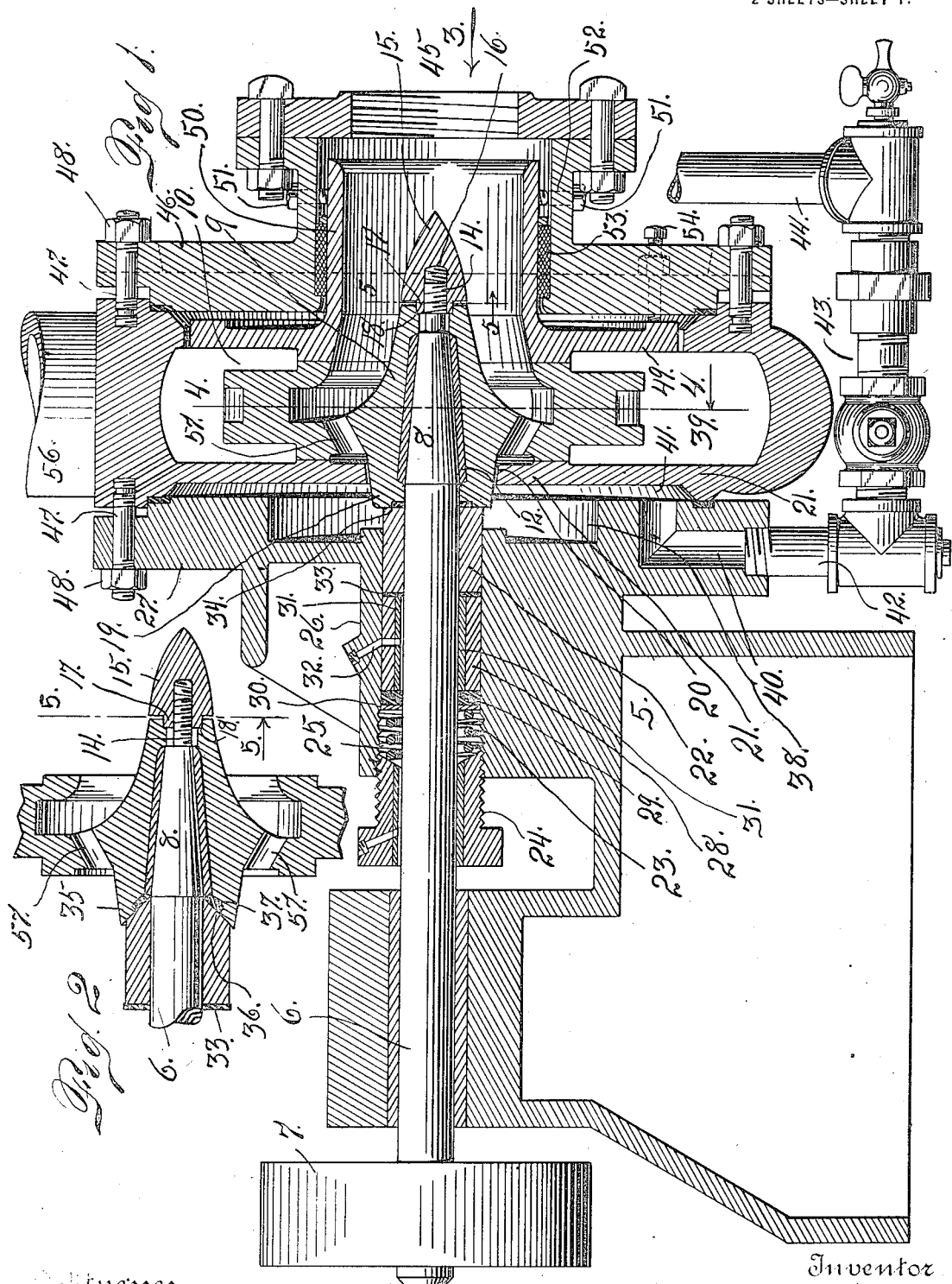

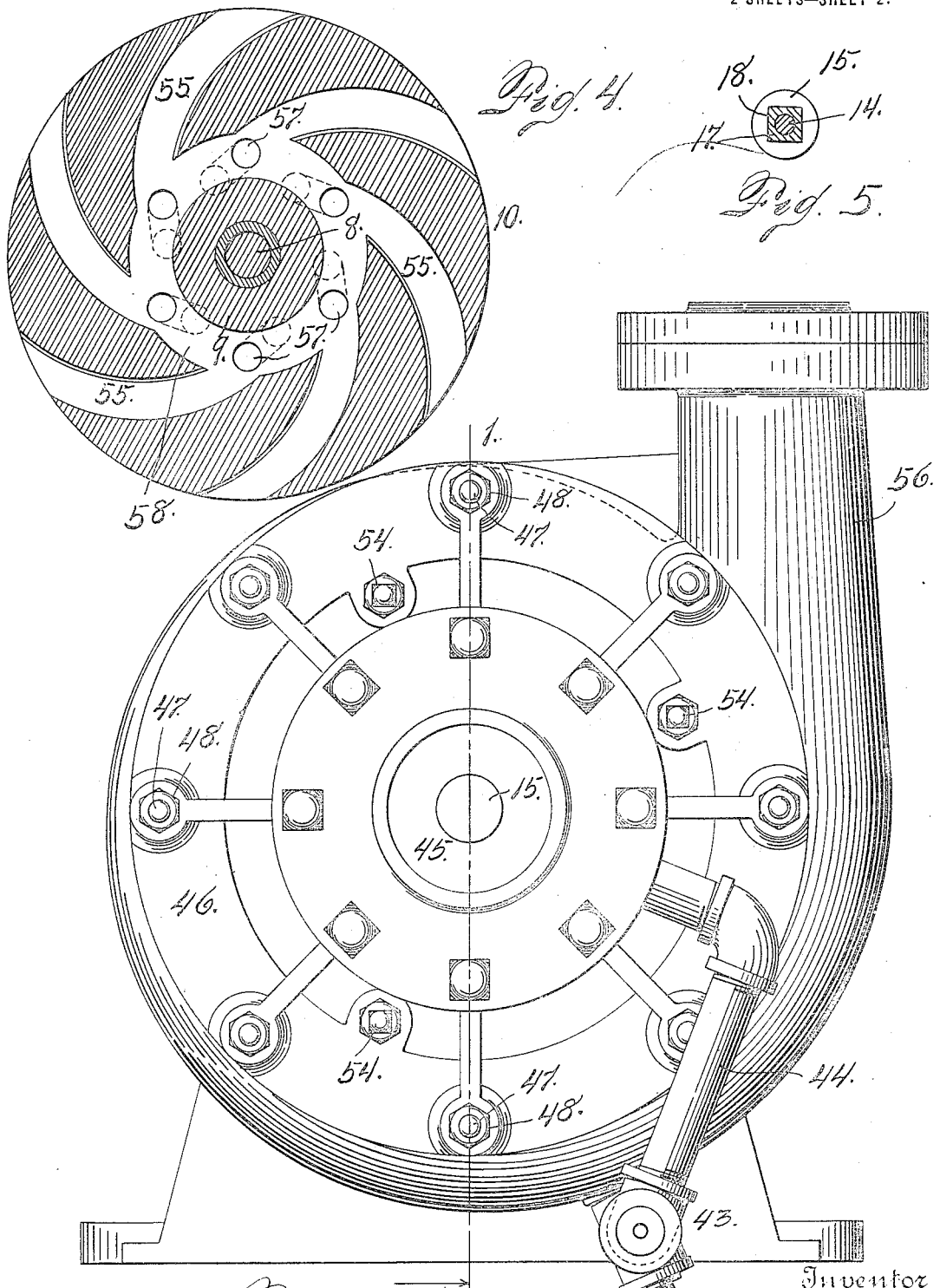

ARTHUR R. WILFLEY, OF DENVER, COLORADO.

CENTRIFUGAL PUMP.

1,289,337.  Specification of Letters Patent. Patented Dec. 31, 1918.

Application filed May 7, 1914. Serial No. 836,915.

*To all whom it may concern:*

Be it known that I, ARTHUR R. WILFLEY, citizen of the United States, residing at the city and county of Denver and State of Colorado, have invented certain new and useful Improvements in Centrifugal Pumps; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in centrifugal pumps, my object being to overcome a number of the difficulties which have been experienced in the operation of these pumps, as heretofore constructed. One of these difficulties consists in the tendency of the shaft to be cut away or worn to such an extent as to render it useless within a comparatively short time, by reason of the dirt and sand working into the main bearing which, as heretofore constructed, is provided with the ordinary stuffing box. This difficulty is experienced in a more pronounced degree where these pumps are employed in pumping water containing a considerable degree of sand. In other words, where these pumps are utilized for raising pulp to the necessary height for delivering it to concentrating apparatus or other mechanism employed in its treatment, the sand works into the ordinary bearings and very soon destroys or cuts out the shaft, owing to the fact that the packing material which is engaged by the gland of the stuffing box cannot be forced against the shaft sufficiently tight to prevent the sand from working between the shaft and such material. This material is necessarily of such character that it will expand, due to the pressure of the gland, and any material of this character cannot be made hard enough by the pressure of the gland to prevent the sand from injuring the shaft in the manner heretofore explained. Furthermore, where the ordinary stuffing box is used, the gland must be adjusted from time to time, but even then, the trouble cannot be obviated.

Hence, one of the novel features of my present improvement consists in the employment of an endwise movable metal bearing sleeve, which acts either upon the hub of the runner which extends through the casing for the purpose, or upon a collar formed integral with the shaft and located at the rear of the runner. In either event, my improved metal endwise movable bearing sleeve acts to prevent the sand from following the shaft and occupies a position between the shaft and the material of which the bearing is composed. My improved bearing sleeve is acted upon by a spiral spring whose tension may be regulated by the employment of a nut.

Another feature of my improvement consists in the special construction of the circular body of the pump, whereby it is composed of an inner chambered member and two members arranged on opposite sides thereof, and connected to clamp the intermediate member. This construction obviates the necessity of employing a lining for the chambered member of pumps of this character. These linings are very difficult to remove and replace, and in order that the lining may be properly applied, the inner surface of the chambered member must be machined, whereby the lining may fit closely thereto. Otherwise, the sand in working in between the lining and the wall of the chamber, will cut out the latter, or in other words, injure the chamber in the precise way which the lining is intended to prevent.

By making the body or casing of the pump in three parts, with the chambered member clamped between the two outer members or heads, the necessity for lining the chambered member is obviated. In other words, when the last named member becomes sufficiently worn to justify such action, it may be discarded and a new member substituted. This is more economical and less troublesome than the old method of removing linings in pumps of this character.

Another feature of novelty consists in forming a chamber in one head of the casing just in the rear of the central member and around the rear extremity of the runner shaft or around the rear extremity of the hub formed on the runner. This chamber is connected through the medium of a by-pass with the suction extremity of the pump, whereby any material that works into this chamber and which otherwise might have a tendency to cut or injure the shaft, is removed through the medium of the suction acting through the by-pass.

Still another feature of novelty consists in connecting the runner with the shaft by means of a nut having a polygonal projection which enters a socket of counterpart shape formed in the forward extremity of the hub of the runner, the arrangement being such that as the runner rotates, it has a tendency to tighten the nut on the threaded extremity of the shaft, and consequently tighten the runner on the shaft and prevent any lost motion which otherwise might result between the shaft and the hub. In order to utilize this feature to the best advantage, the forward extremity of the shaft is tapered or frusto-conical in shape, while the socket of the hub is equipped with a bushing of counterpart shape.

Having briefly outlined my improvement, I will proceed to describe the same in detail, reference being made to the accompanying drawing in which is illustrated an embodiment thereof.

In this drawing,—

Figure 1 is a section taken through my improved pump on the line 1—1, Fig. 3.

Fig. 2 is a fragmentary section showing a modified form of construction.

Fig. 3 is a side elevation of the pump, being a view looking in the direction of arrow 3, Fig. 1.

Fig. 4 is a section taken through the runner on the line 4—4, Fig. 1, shown on a larger scale.

Fig. 5 is a section taken on the line 5—5, Fig. 1, looking in the direction of the arrow.

The same reference characters indicate the same parts in all the views.

Let the numeral 5 designate a stationary framework in which is journaled the operating shaft 6 carrying an operating pulley 7. The opposite extremity of this shaft is tapered as shown at 8, to enter a socket formed in the hub 9 of the runner 10, the said socket being equipped with a bushing 12. The forward extremity of the shaft is reduced and threaded as shown at 14 to receive a nut 15 having a threaded recess 16 to receive a threaded end of a shaft. This nut is tapered to a point at its forward extremity, while the rear extremity is provided with a polygonal projection 17, entering a recess 18 of counterpart shape formed in the forward extremity of the runner hub, whereby, when the runner is applied to the shaft, the nut is threaded thereon by rotating the runner, and during use of the pump, the rotation of the runner operates the nut, whereby any lost motion due to wear between the runner and the shaft is automatically taken up, thus keeping the runner tight on the shaft at all times.

As illustrated in the drawing, the hub 9 has a rearward extension 19 which passes through an opening 20 formed in the body member 21 of the casing. The rear extremity of this hub is engaged by a metal bearing sleeve 22 which is slidable on the shaft and caused to tightly engage the rear extremity of the hub, being actuated by a spiral spring 23 which surrounds the shaft in the rear of the sleeve and is itself acted on by a tension nut or gland 24 which is threaded into the rear extremity 25 of the bearing member 26, which is formed on the rear head 27 of the casing.

As illustrated in the drawing, a second metal bearing sleeve 28, together with a soft ring or gasket 29 and a metal washer 30, are located between the spring 23 and the metal bearing sleeve 22. The latter, however, may extend the entire distance between the spring and the hub of the runner, or a collar formed integral with the shaft and located in the rear of the runner, as may be desired. As shown in the drawing, the sleeve 28 is provided with a bushing 31 composed of Babbitt or other suitable material. The bearing member 26, together with the sleeve 28 and its bushing, are provided with orifices 32 for the introduction of oil to the shaft. Furthermore, as shown in the drawing, there is a thin, soft packing member 33 between the metal sleeves 22 and 28.

By virtue of the construction just described, it will be understood that the tension of the spiral spring 23 which acts on the bearing sleeve 22 at all times, either directly or through the medium of interposed parts, will cause the last named sleeve to tightly engage the hub of the runner and prevent any sand which may pass through the opening 20 from working into the shaft between the hub and the sleeve, since, as the hub and the sleeve wear, the tension of the spring will automatically prevent the possibility of any space being left between these parts for the sand to pass. If desired, a relatively small recess may be formed in the rear extremity of the hub, which will be filled by a soft packing 34. It is believed, however, that it will not be necessary to resort to the use of this packing material, and that highly desirable results may be obtained by employing a bearing sleeve whose forward extremity is in direct engagement throughout its entire area, and at all times with the rear extremity of the runner hub. However, if desired, the form of construction illustrated in Fig. 2 may be employed. That is to say, a frusto-conical socket 35 may be formed in the rear extremity of the hub and engaged by the forward extremity of a bearing sleeve 36 which is of counterpart shape. In this event, a soft bearing member 37 may be employed adjacent the shaft, the same being located at the forward extremity of the socket 35. It is preferred however, to employ the straight or vertical faces for the bearing sleeve and hub of the runner, since even if the runner should have a lateral movement on the shaft, the joint between the bearing sleeve and runner hub would not be disturbed but would remain perfectly tight at all times, notwithstanding such lateral movement; while this would not be true of the form of construction illustrated in Fig. 2, though under ordinary circumstances, it is believed that good results may be obtained by the employment of the last named construction.

The rear head of the body of the pump is provided adjacent and surrounding the rear extremity of the runner hub, and the forward extremity of the bearing sleeve 22, with a chamber 38, adapted to receive any material that may work out of the runner chamber 39 through the opening 20. This chamber is connected with the suction extremity of the pump through the medium of a passage 40 and suitable connections, this passage 40 being connected at one extremity with an enlargement 41 of the chamber 40, the said enlargement being formed by reducing the adjacent wall of the member 21 of the casing. The connection with the outer extremity of the passage 40 is a pipe member 42, the latter being connected at its outer end with a conduit member 43 extending at right angles to the part 42, while at the forward extremity of the part 43, a pipe section 44 leads through the medium of an opening, to the suction extremity 45 of the pump. It will be understood that the specific construction through the medium of which the chamber 40 is connected with the suction extremity of the pump, is immaterial, that illustrated in the drawing being a conventional device intended to illustrate the general idea of the construction.

The body member 21 of the pump is clamped between a rear head 27 and a forward head 46. This connection may be brought about in any desired manner. As illustrated in the drawing, stud bolts 47 are cast with the body member 21 and extend therefrom in opposite directions. The heads 27 and 46 are perforated to receive these studs, and nuts 48 are applied to their outer extremities, whereby the heads are tightly secured to the central member 21 in operative relation. The forward extremity of the runner bears against the rear face of an inner member 49 provided with a forwardly extending sleeve 50, through which the water enters the runner. This sleeve is centered by adjusting screws 51 threaded into a forwardly extending sleeve 52 with which the head 46 is provided. Furthermore, between the sleeve 52 and the head 46, a packing member 53 is located. The interior member 49 is further positioned and adjusted by means of stud bolts 54 which are threaded into the head 46 and engage the disk portion of the said member.

From the foregoing description, the use and operation of my improved centrifugal pump will be readily understood. The rotary motion imparted to the runner is obtained through the medium of the shaft 6 and pulley 7, the latter being connected in any suitable manner with the desired form of motor. As the runner rotates within the chamber 39 of the casing, the water is drawn into the runner and passes, through the medium of centrifugal force, outwardly through the spiral passages 55 formed in the inner runner, and as best illustrated in Fig. 4. These passages as disclosed in the drawing are of uniform size throughout their length. Heretofore, so far as I am aware, the corresponding passages in the runners of centrifugal pumps have increased in size from their inner extremities outwardly. I have found that by making these passages of uniform size, better results are obtained, for the reason that the water when it leaves the outer extremities of these passages, will move with greater force than if the passages were larger at their outer extremities. And this result increases the centrifugal action which causes the water to rise in the stand pipe connected with the discharge member 56 of the pump.

The advantages of my improvements have been set forth during the detailed description, and it therefore will not be necessary to go further into the matter. It should be explained, however, that the runner is provided with the usual openings 57, extending rearwardly from the central portion 58 of the chamber therein, whereby the suction has a tendency to prevent material from escaping through the rear opening of the casing.

Attention is called to the fact that the joint formed by the engagement of the bearing member 22 with the hub of the runner, is so constructed that the centrifugal force developed by the rotary action of the shaft and the runner has a tendency to prevent sand, dirt or foreign matter of any kind from reaching the shaft between the members of the joint. This is an important distinction between a joint of this character and that formed by the usual stuffing box, which has heretofore been employed in connection with pumps of this character.

Having thus described my invention, what I claim is,—

1. A shaft having a runner mounted thereon, the latter being provided with a hub extending rearwardly from its body portion, a sleeve endwise movable on the shaft, a spiral spring acting on the said sleeve, and a nut for controlling the tension of said spring.

2. A shaft equipped with a bearing member and an abutment, one of said elements being movable longitudinally of the shaft and a spiral spring surrounding the shaft and acting on said element to maintain the same in coöperative engagement with the other element to form a tight joint around the shaft in the rear of the runner.

3. A shaft bearing comprising a bearing member, a bearing sleeve within the bearing member, a shaft extending through said sleeve, an abutment fast on the shaft having a face in engagement with a face of the bearing sleeve, and means within said bearing member resiliently holding said bearing sleeve in engagement with said abutment.

4. A shaft bearing comprising a bearing member, a bearing sleeve within the bearing member, a shaft extending through said sleeve, an abutment fast on the shaft having a face in engagement with a face of the bearing sleeve, means within said bearing member resiliently holding said bearing sleeve in engagement with said abutment, and means to retain said resilient holding means within the bearing member.

In testimony whereof I affix my signature in presence of two witnesses.

ARTHUR R. WILFLEY.

Witnesses:
 MAZE KIRBY,
 A. EBERT O'BRIEN.